United States Patent [19]
Levine et al.

[11] Patent Number: 5,894,575
[45] Date of Patent: Apr. 13, 1999

[54] METHOD AND SYSTEM FOR INITIAL STATE DETERMINATION FOR INSTRUCTION TRACE RECONSTRUCTION

[75] Inventors: Frank Eliot Levine; Bradley David McCredie; William John Starke; Edward Hugh Welbon, all of Austin, Tex.

[73] Assignee: International Business Machines Corporation, Armonk, N.Y.

[21] Appl. No.: 08/758,196

[22] Filed: Nov. 25, 1996

[51] Int. Cl.$^6$ ..................................................... H04B 17/00
[52] U.S. Cl. ........................ 395/704; 395/444; 395/445
[58] Field of Search ................................ 395/704, 444, 395/445, 447, 449, 384

[56] References Cited

U.S. PATENT DOCUMENTS

| | | |
|---|---|---|
| 5,226,130 | 7/1993 | Favor et al. . |
| 5,261,066 | 11/1993 | Jouppi et al. . |
| 5,317,718 | 5/1994 | Jouppi . |
| 5,355,467 | 10/1994 | MacWilliams et al. . |
| 5,511,175 | 4/1996 | Favor et al. . |
| 5,701,503 | 12/1997 | Singh et al. ............................ 395/800 |

OTHER PUBLICATIONS

H. Dwyer Et Al., "Technique For Speculatively Sampling Performance Parameters" IBM Technical Disclosure Bulletin, vol. 37, No. 09, pp. 589–592, Sep. 1994.

*Primary Examiner*—Thomas Peeso
*Attorney, Agent, or Firm*—Casimer K. Salys; Andrew J. Dillon

[57] ABSTRACT

A method and system for determining an initial architectural state for instruction trace reconstruction. Performance projections for processor systems and memory subsystems are important for a correct understanding of work loads within the system. An instruction trace is generally utilized to determine distribution of instructions, identification of register dependencies, branch path analyses and timing. One well-known technique for reconstructing an instruction trace can be accomplished by monitoring bus traffic to determine instruction addresses, data addresses and data during the trace. However, the initial architectural state (the state of all caches, buffers and registers) must be determined in order to accurately reconstruct an instruction trace. At least one cache within the processor system is divided into two portions, the content of that cache is invalidated and each cache entry thereafter is duplicated within each portion of the divided cache. Upon initiation of an instruction trace, one half of the cache is frozen, preserving the initial state of the system with respect to that cache without requiring the cache to be invalidated and refilled during the instruction trace, so that the initial state may be utilized to reconstruct an instruction trace in combination with the monitored bus traffic.

12 Claims, 4 Drawing Sheets

METHOD AND SYSTEM FOR INITIAL STATE DETERMINATION FOR INSTRUCTION TRACE RECONSTRUCTION

CROSS REFERENCE TO RELATED APPLICATIONS

The present application is related to co-pending applications Ser. No. 08/758,198 (AT9-96-157) and Ser. No. 08/758,197 (AT9-96-158) which are assigned to the assignee herein named and which are filed of even date herewith. The content of those co-pending applications are incorporated herein by reference thereto.

BACKGROUND OF THE INVENTION

1. Technical Field

The present invention relates in general to an improved method and system for instruction trace reconstruction in a data processing system and in particular to an improved method and system for initial state determination for instruction trace reconstruction. Still more particularly, the present invention relates to an improved method and system for efficiently determining an initial state of cache memories within a processor system upon initiation of an instruction trace.

2. Description of the Related Art

Data processing systems in recent years have been improved on a continuous and highly accelerated basis. Whether the improvements to such data processing systems are software related or hardware related, it is important for a developer to have some expectation of the performance of a new system under construction before that system is actually completely developed. In order to make this evaluation of an expected new system or changes to a current system, various techniques are known. Many different approaches have been utilized within the computer industry in order to understand and characterize those parameters which can be utilized to predict the value associated with a proposed set of changes. One particular approach is a full system software simulation of the entire system, including all of the system devices and the system software, accesses to data stored within a direct access storage device. A complete system simulation approach requires an extremely significant investment in software and has the drawback that the time required to run such a simulation is extremely long. Another approach utilized by developers is an effort to develop accurate, "representative instruction traces" which permit the use of a simplified system model in order to predict the performance of the new system.

Performance projections for processors and memory subsystems are critically dependent upon a correct understanding of the workloads which are imposed on such systems. In order to accurately predict the performance of a proposed system and assist in selecting among the various designed trade-offs, it is necessary to collect instruction streams (i.e., "traces") that statistically represent actual workloads. By utilizing traces which represent a fixed workload as input to a system model that allows variations on some hardware parameter, such as the number of processors, developers hope to be able to predict performance for that workload with a different number of processors.

One known software approach to developing an instruction and address trace is the so-called "single-step" mechanism, where a single step interrupt handler is executed immediately before or after an instruction is executed. The interrupt handler may then decode the instruction and write the pertinent information regarding that instruction to a trace buffer. The trace buffer may be provided within system memory or may be in a special hardware buffer. The hardware buffer approach is often implemented by having the interrupt handler write the relevant information at a specific address on the processor bus which is then captured by a bus monitor looking for data at that address.

Another known variation is the execution of software in a simulation model. The simulation mode works well on so-called RISC systems such as the RISC System/6000 machine running AIX or other suitable software for constructing application traces. Such an approach does have several drawbacks if it is utilized in an attempt to capture kernel traces as well. In a typical implementation that supports the capturing of kernel traces, the code is updated or "instrumented" to provide relevant information as part of the tracing process. When software approaches like these are utilized that include kernel activities, it is very important to provide some type of compensation to reflect the fact that the system timings have been perturbed. For example, there may be a much larger number of timer ticks executed than would normally be utilized and thus, the ratio of external interrupts to code being executed is similarly affected. Compensating for such timing changes may be fairly reasonable for benchmarks that are not utilizing many kernel services and/or external interrupts.

Instruction and address traces which are constructed via software instrumentation techniques can be very invasive and often severely affect the system under test. Traces produced in this manner are very time consuming, but they provide information required for fairly simple application (problem state) intensive benchmarks, where the kernel accesses are negligible. However, traces developed under conditions where the software is instrumented, are not typically considered suitably representative to characterize extremely dynamic work loads which access kernel services, such as those found in On-Line Transaction Processing (OLTP) work loads. Full system simulation approaches avoid these problems, but require an extreme investment in both software and in the time the simulation requires to run.

One technique for providing traces utilizes the processor to externalize information about what is going on inside the processor via signals or pins which can be monitored from outside the processor. A simple instruction trace can be externalized in a very straightforward manner by simply putting out the actual instruction being executed on every processor cycle. An operand address trace can be externalized by putting out the operand address on such pins. By understanding the content of the processor's internal buffers, encoded information may then be utilized to identify the operand addresses. That is, for example, signals can be utilized to identify a hit or a miss in the processor's cache or translation lookaside buffer (TLB). In case of a hit, encoded information, such as an index into the internal buffer, can be utilized to capture and construct virtual address traces. In the event of a miss, more cycles are available to give the actual address (either real or virtual) of the operand of the instructions. Both of these approaches have the drawback of requiring many pins and, as a practical matter, may be difficult to support at full speed. The processor support required may be difficult to implement due to out-of-order execution and superscalar designs with multiple instructions being dispatched and completing on a single cycle. Capturing of the data is also difficult due to the increasing speeds of modern processors. In order to actually support this approach, the speed of the processor and/or the system may have to be reduced and the processor may have to run in a single instruction issue mode.

Thus, while it is well known that a representative instruction trace may be provided for a system under test by attempting the reconstruction of an actual instruction sequence utilizing instruction and address data monitored on the system bus, the problem of determining the initial state of the system upon initiation of such an instruction trace is non-trivial. One technique utilizes the software to force the initial state of the processor to a known state by copying or invalidating the content of the registers, buffers and caches associated with the processor and then monitoring the bus as the registers, buffers and caches are refilled. While this technique permits the initial state of a system under test to be accurately determined, the size of the registers and busses utilized in modern systems results in a substantial delay while initial state is being determined. Further, the flushing of a cache and the refilling of that cache during instruction processing can also adversely affect the system under test.

Consequently, those having ordinary skill in the art will appreciate that a need exits for an improved method and system for determining the initial architected state of a processor during an instruction trace.

SUMMARY OF THE INVENTION

It is therefore one object of the present invention to provide an improved method and system for instruction trace reconstruction in a data processing system.

It is another object of the present invention to provide an improved method and system for initial state determination for instruction trace reconstruction within a data processing system.

It is yet another object of the present invention to provide an improved method and system for efficiently determining an initial state of cache memories within a data processing system upon initialization of an instruction trace.

The foregoing objects are achieved as is now described. A method and system are disclosed for determining an initial architectural state for instruction trace reconstruction. Performance projections for processor systems and memory subsystems are important for a correct understanding of work loads within the system. An instruction trace is generally utilized to determine distribution of instructions, identification of register dependencies, branch path analyses and timing. One well-known technique for reconstructing an instruction trace can be accomplished by monitoring bus traffic to determine instruction addresses, data addresses and data during the trace. However, the initial architectural state (the state of all caches, buffers and registers) must be determined in order to accurately reconstruct an instruction trace. At least one cache within the processor system is divided into two portions, the content of that cache is invalidated and each cache entry thereafter is duplicated within each portion of the divided cache. Upon initiation of an instruction trace, one half of the cache is frozen, preserving the initial state of the system with respect to that cache without requiring the cache to be invalidated and refilled during the instruction trace, so that the initial state may be utilized to reconstruct an instruction trace in combination with the monitored bus traffic.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
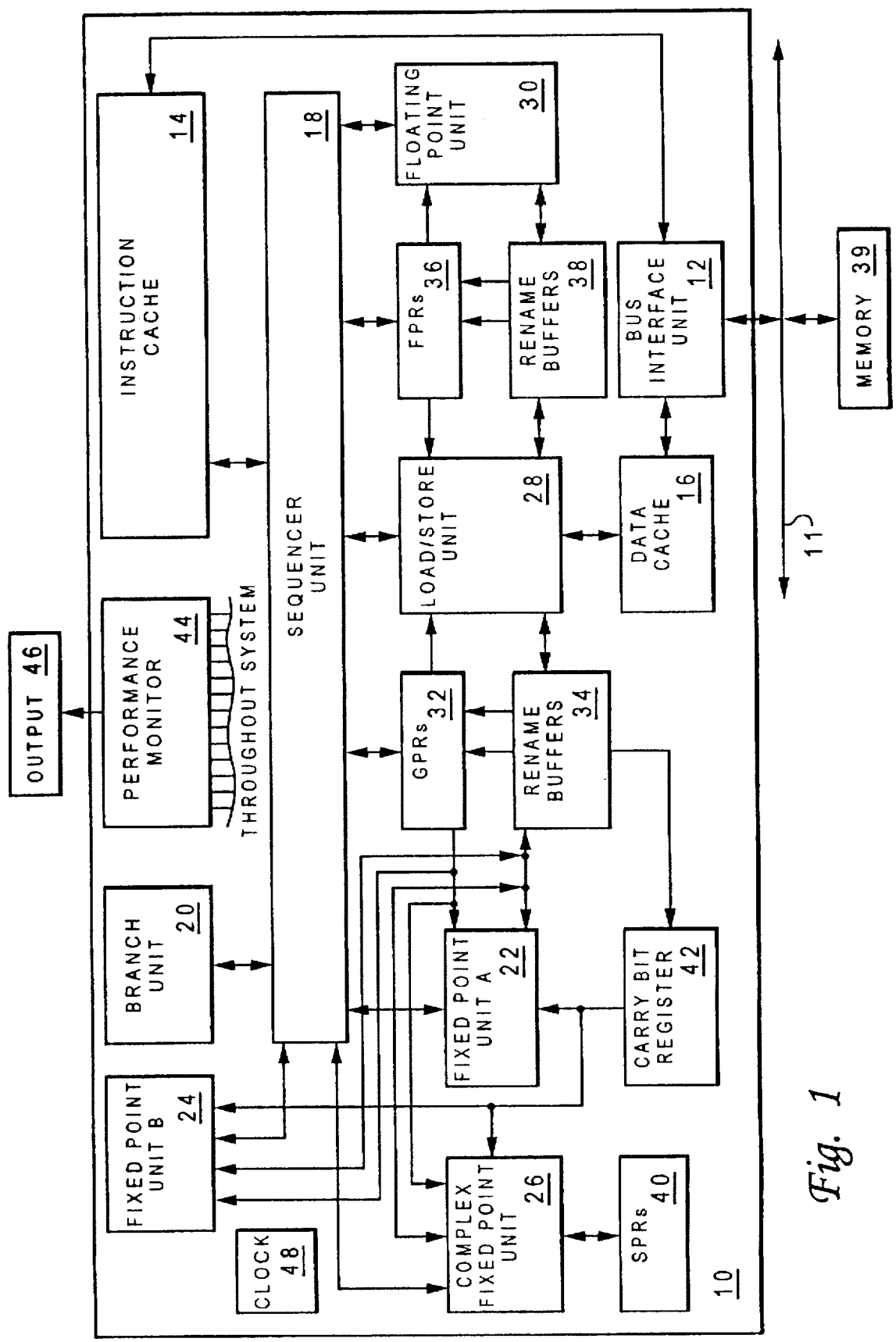
FIG. 1 is a high level block diagram of a processor system which may be utilized to implement the method and system of the present invention.

FIG. 1 is a block diagram of a processor 10 system for processing information according to the illustrative embodiment. In the illustrative embodiment, processor 10 is a single integrated circuit superscalar microprocessor. Accordingly, as discussed further hereinbelow, processor 10 includes various processor assets including execution units, registers, buffers, memories, and other sections, all of which are formed by integrated circuitry. Also, in the illustrative embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the illustrative embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction. LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 16. If one or more of the sequence of instructions is not stored in instruction cache 14, then instruction cache 14 inputs (through BIU 12 and system bus 11) such instructions from system memory 39 connected to system bus 11.

In response to the instructions input from instruction 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Also depicted within processor 10 is performance monitor 44. Performance monitor 44 is utilized, in a manner well known to those having ordinary skill in the art, to optimize the performance of a data processing system. Timing data from the performance monitor may be utilized to optimize programs. In addition, performance monitor 44 may be utilized to gather data about access times from system caches and main memories and, monitor performance of the various units within processor 10.

In a common utilization of performance monitor 44, performance monitor 44 is coupled to FXUA 22, FXUB 24, CFXU 26, LSU 28, BIU 12, branch unit 20, instruction cache 14, data cache 26, sequencer unit 18, FPU 30, and various registers within processor 10 system. Various outputs generated within performance monitor 44 are coupled to output 46, commonly referred to as a "debug" port.

For a further discussion of the use of performance monitoring within a superscalar data processing system, see U.S. Pat. No. 5,557,548, issued to certain of the inventors herein named and assigned to the assignee of the present application.

Finally, clock 48 is depicted schematically within FIG. 1. Clock 48 is utilized to provide processor clock cycles to the various units within processor 10 system.

Figure 2:
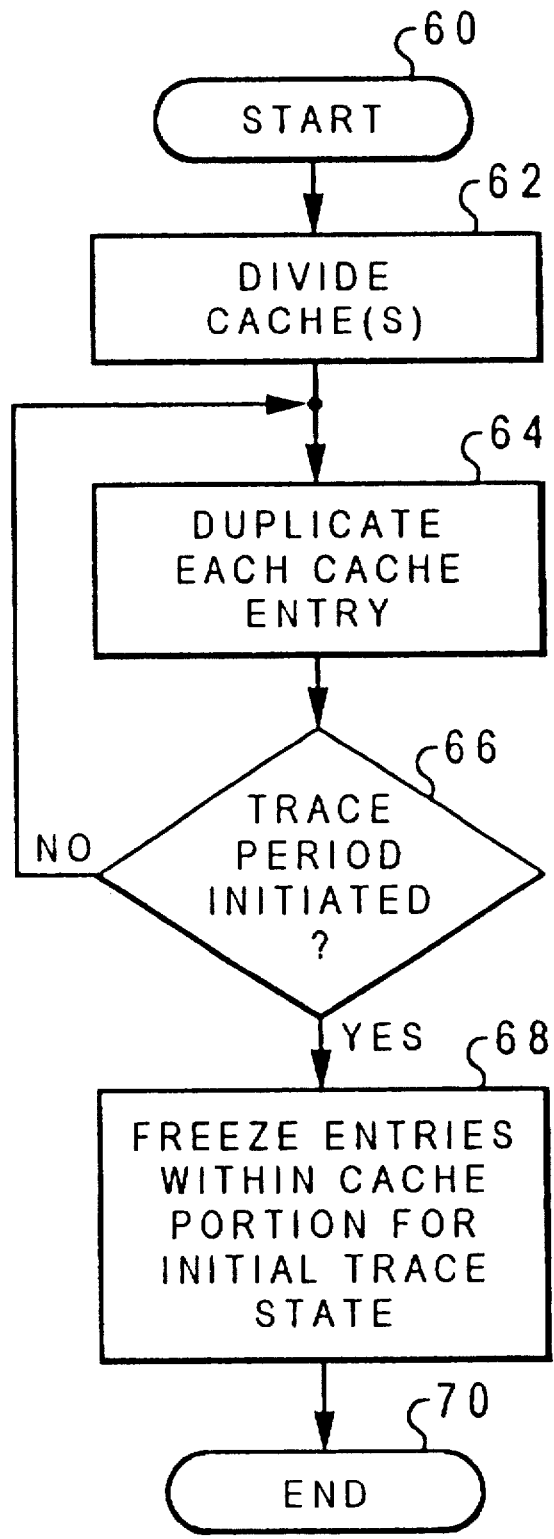
FIG. 2 is a high level logic flow chart illustrating a method for determining an initial state of a cache memory within the processor system of FIG. 1 in accordance with the method and system of the present invention.

Referring to FIG. 2, there is depicted a high-level flow chart which illustrates one method for determining an initial state of a cache memory within processor 10 system of FIG. 1. As depicted, this process begins at block 60 thereafter passes to block 62. Block 62 depicts the dividing of a cache into two portions. For purposes of illustration, both instruction cache 14 and data cache 16 may be so divided. The utilization of this technique provides an indication of the initial state of a cache upon the initiation of an instruction trace, without requiring the time necessary to invalidate an entire cache and refill that cache with appropriate data at the time of the instruction trace.

Next, the process passes to block 64. Block 64 illustrates the duplication of each new cache entry within the system during processing of instructions in order to replace invalidated entries in each half, such that upon initiation of an instruction trace, the cache halves are already filled with valid data. That is, in a manner which will be illustrated in greater detail herein, each new cache entry made is duplicated within each portion of the divided cache.

Next, the process passes to block 66. Block 66 illustrates a determination of whether or not the trace period has been initiated and if not, the process returns to block 64, in an iterative fashion, to continue duplicating each cache entry.

Still referring to block 66, in the event the trace period has been initiated, the process passes to block 68. Block 68 depicts the freezing of the entries within one cache portion in order to accurately determine the initial trace state of that cache. The process then passes to block 70 and terminates.

Upon reference to the foregoing, those skilled in the art will appreciate that by dividing one or more caches in half, prior to initiation of an instruction trace, and then refilling both halves before initiating an instruction trace, in the manner depicted within FIG. 2, the perturbing effect of invalidating the caches during an instruction trace is avoided. This may be accomplished by utilizing a system in which the system is designed to operate in a mode wherein only one half of the cache is utilized. In such a case, a simple enhancement may be provided, for internal use, which supports a signal which writes the same data, including directory data, to the normally "unused" portion of the cache. Thereafter, when that signal changes states, data will no longer be written to that portion of the cache, thus preserving the initial state of the cache. This data may then be retrieved via an appropriate interface.

Figure 3:
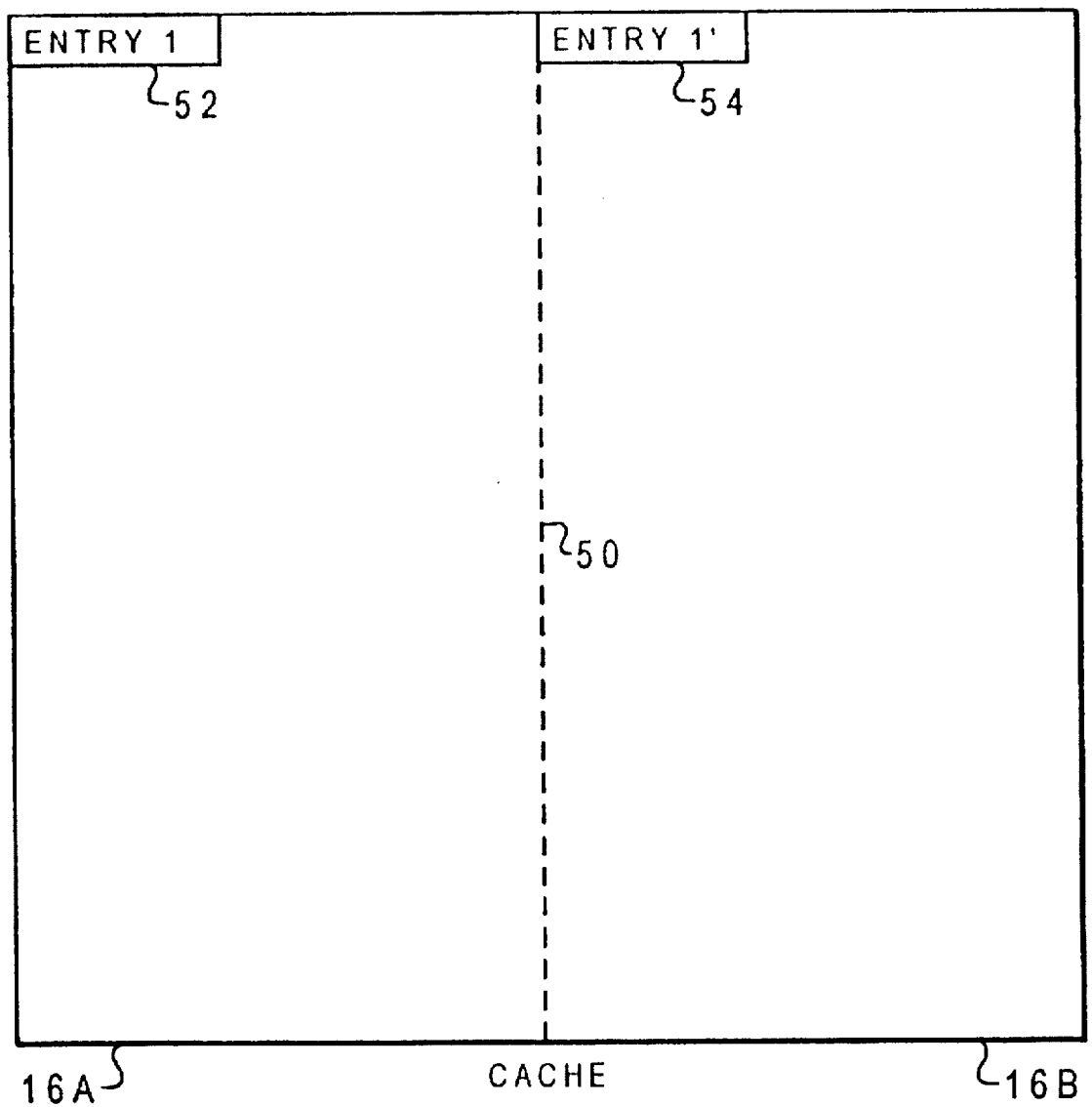
FIG. 3 is a schematic representation of a divided cache memory which may be utilized to implement the method and system of the present invention.

This process of dividing the cache is schematically depicted within FIG. 3 which illustrates a digital cache memory which may be utilized to implement the method and system of the present invention. As depicted, cache 16 is divided into a first portion, 16A and a second portion, 16B by means of a partition 50 and both halves of the cache are either cleared or invalidated. Thereafter, each time an entry, such as entry 52, is written into cache portion 16A, an identical entry, entry 54, is written into cache portion 16B. Thus, after a sufficient period of operation, cache 16B will in effect be a "shadow" of cache 16A. Thereafter, upon the initiation of an instruction trace, the duplication of cache entries is terminated and the content of cache portion 16B will represent an accurate depiction of the initial state of the cache which may then be utilized to reconstruct an instruction trace.

Figure 4:
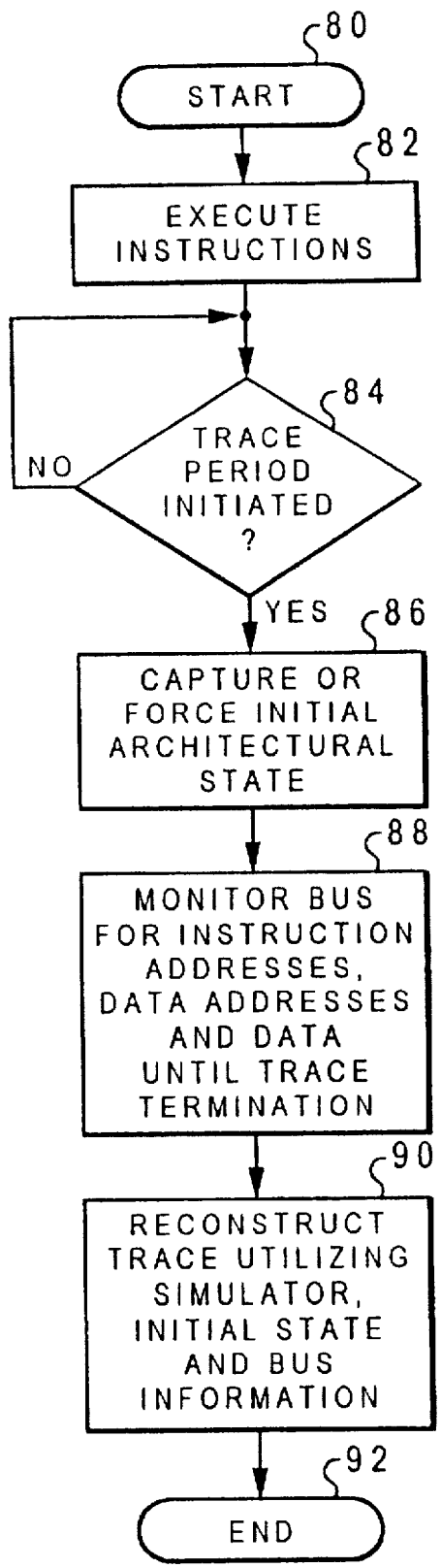
FIG. 4 is a high level logic flow chart illustrating a method for instruction trace reconstruction in accordance with the method of the present invention.

Finally, referring to FIGS. 4A and 4B, there is depicted a high level logic flow chart which illustrates a method for instruction trace reconstruction in accordance with the method and system of the present invention. As depicted, this process begins at block 80.

Next, the process passes to block 82. Block 82 illustrates the execution of instructions. It should be noted that during this period of time the content of the cache will be duplicated, as illustrated within FIG. 3.

Next, as depicted in block 84, a determination occurs as to whether or not a trace period has been initiated. If not, the process merely iterates until the trace period initiates.

Still referring to block 84, in the event a trace period has been initiated the process passes to block 86. Block 86 illustrates the forcing or capturing of the initial architectural state. As described above, the initial state for one or more caches within the system may be captured by freezing entries within the duplicate portion of each cache such that the initial state may be captured for future use. Similarly, the content of architected registers and buffers may be copied or invalidated such that the content of those registers and buffers becomes a known initial state.

Next, block 88 illustrates the monitoring of the system bus for instruction addresses, data addresses and data. Finally, utilizing a processor simulator in a manner well known in the art, block 90 illustrates the reconstruction of an instruction trace utilizing the initial state determined from the divided cache memories, the forced initial state of the buffers and registers and the monitored bus information. Of course, utilizing this data does not identify the exact number of instructions executed and the exact paths taken so that the output of the reconstructed trace must be made to correlate with the bus data which has been monitored. In such an instance, it is reasonable to expect that trace reconstruction software will be utilized which can detect an anomalous path and redo the trace reconstruction utilizing an alternate path in response to such detection. Most of the existing architectural instruction simulators known in the art provide for a "backup and restart" capability. Additionally, a more brute force approach may be utilized which restarts the entire trace reconstruction and chooses a different path at those locations which are a suspect within the originally derived trace. Additionally, depending on how much data has been collected and how much software one is willing to invest in a trace reconstruction algorithm, there are multiple techniques which may be utilized to increase the accuracy and value of a reconstructed trace. For example, in order to derive correct paths, one need only capture data entering the processor. There is an opportunity; however, to capture data which is read from a register and eventually written to memory. Thus, under certain circumstances, the trace reconstruction software could look ahead in the trace to see what data was actually read from the register.

After the reconstruction of an instruction trace in the manner described above, the process passes to block 92 and terminates.

Upon reference to the foregoing, those skilled in the art will appreciate that the Applicants herein have provided a technique whereby the initial state of a large and complex cache memory may be rapidly and efficiently determined for purposes of reconstructing an instruction trace, without requiring the flushing of the entire cache at the time of the initiation of the instruction trace and the time consuming refilling of that cache. In this manner, instruction trace reconstruction may be efficiently performed while minimizing the affect upon the system under test.

While the invention has been particularly shown and described with reference to a preferred embodiment, it will be understood by those skilled in the art that various changes in form and detail may be made therein without departing from the spirit and scope of the invention.

We claim:

1. A method of tracing the execution of a plurality of instructions within a processor system which includes a processor, a main memory and a cache memory, which are interconnected via a bus, said method comprising the steps of:

dividing said cache memory into a first portion and a second portion; executing a series of instructions;

during execution of said series of instructions, duplicating each new cache entry within said first portion of said cache memory with an identical entry within said second portion of said cache memory;

initiating an instruction trace;

in response to said initiation of said instruction trace, suspending further entries into said second portion of said cache memory and monitoring subsequent instruction addresses, data addresses and data on said bus; and thereafter, reconstructing an instruction trace utilizing said monitored instruction addresses, data addresses and data and said entries within said second portion of said cache memory.

2. The method of tracing the execution of a plurality of instructions within a processor system according to claim 1 wherein said processor system further includes a plurality of registers and buffers and wherein said method further includes the step of:

copying the content of at least selected ones of said plurality of buffers and registers in response to said initiation of said instruction trace.

3. The method of tracing the execution of a plurality of instructions within a processor system according to claim 1 wherein said processor system includes a data cache and an instruction cache and wherein said step of dividing said cache memory into a first portion and a second portion comprises the steps of dividing said data cache into a first portion and a second portion.

4. The method of tracing the execution of a plurality of instructions within a processor system according to claim 3 wherein said processor system includes a data cache and an instruction cache and wherein said step of dividing said cache memory into a first portion and a second portion comprises the steps of dividing said data cache into a first portion and a second portion and dividing said instruction cache into a first portion and a second portion.

5. The method of tracing the execution of a plurality of instructions within a processor system according to claim 1 wherein said processor system includes a data cache and an instruction cache and wherein said step of dividing said cache memory into a first portion and a second portion comprises the steps of dividing said data cache into a first portion and a second portion further including the step of invalidating the content of said cache memory prior to executing said series of instructions.

6. A system for tracing the execution of a plurality of instructions within a processor system which includes a processor, a main memory and a cache memory which are interconnected via a bus, said system comprising:

means for dividing said cache memory into a first portion and a second portion;

means for executing a series of instructions;

means for duplicating each new cache entry within said first portion of said cache memory with an identical entry within said second portion of said cache memory during execution of said series of instructions;

means for initiating an instruction trace;

means for suspending further entries into said second portion of said cache memory and monitoring subsequent instruction addresses, data addresses and data on said bus in response to said initiation of said instruction trace; and means for thereafter reconstructing an instruction trace utilizing said monitored instruction addresses, data addresses and data and said entries within said second portion of said cache memory.

7. The system for tracing execution of a plurality of instructions within a processor system according to claim 6 wherein said processor system further includes a plurality of registers and buffers and wherein said system further comprises means for copying the content of at least selected ones of said plurality of buffers and registers in response to said initiation of said instruction trace.

8. The system for tracing execution of a plurality of instructions within a processor system according to claim 6 wherein said processor system includes a data cache and an instruction cache and wherein said means for dividing said cache memory into a first portion and a second portion comprises means for dividing said data cache into a first portion and a second portion.

9. The system for tracing execution of a plurality of instructions within a processor system according to claim 8 wherein said processor system includes a data cache and an instruction cache and wherein said means for dividing said cache memory into a first portion and a second portion comprises means for dividing said data cache into a first portion and a second portion and dividing said instruction cache into a first portion and a second portion.

10. The system for tracing execution of a plurality of instructions within a processor system according to claim 6 wherein said processor system further includes a plurality of registers and buffers and wherein said system further comprises means for flushing the content of at least selected ones of said plurality of buffers and registers in response to said initiation of said instruction trace, further including means for invalidating the content of said cache memory prior to executing of said series of instructions.

11. A method of tracing the execution of a plurality of instructions within a processor system which includes a processor and a plurality of processor assets which are interconnected via a bus, said method comprising the steps of:

dividing said processor assets into a first portion and a second portion;

executing a series of instructions;

during execution of said series of instructions, duplicating each action within said first portion of said processor assets with an identical action within said second portion of said processor assets;

initiating an instruction trace;

in response to said initiation of said instruction trace, suspending further actions within said second portion of said processor assets and monitoring subsequent instruction addresses, data addresses and data on said bus; and thereafter, reconstructing an instruction trace utilizing said monitored instruction addresses, data addresses and data and said actions within said second portion of said processor assets.

12. The method of tracing the execution of a plurality of instructions within a processor system according to claim 11 wherein said processor system further includes a plurality of registers and buffers and wherein said method further includes the step of:

copying the content of at least selected ones of said plurality of buffers and registers in response to said initiation of said instruction trace.

\* \* \* \* \*